US008743905B2

(12) United States Patent
Ray et al.

(10) Patent No.: US 8,743,905 B2
(45) Date of Patent: Jun. 3, 2014

(54) METHOD AND APPARATUS FOR BUNDLING AND CIPHERING DATA

(75) Inventors: Siddharth Ray, Bridgewater, NJ (US); Ashwin Sampath, Skillman, NJ (US); Peter A. Barany, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 367 days.

(21) Appl. No.: 12/643,713

(22) Filed: Dec. 21, 2009

(65) Prior Publication Data

US 2010/0158044 A1 Jun. 24, 2010

Related U.S. Application Data

(60) Provisional application No. 61/139,930, filed on Dec. 22, 2008.

(51) Int. Cl.
*H04J 3/24* (2006.01)
(52) U.S. Cl.
USPC ............ 370/469; 370/474; 370/389; 370/394
(58) Field of Classification Search
USPC .......................... 370/474, 469, 389, 394, 477
See application file for complete search history.

(56) References Cited

U.S. PATENT DOCUMENTS

2008/0226074 A1* 9/2008 Sammour et al. ............. 380/270
2009/0175173 A1* 7/2009 Kim et al. ..................... 370/241

FOREIGN PATENT DOCUMENTS

WO WO2008137962 11/2008
WO WO 2008137962 A2 * 11/2008 ................ H04L 1/00

OTHER PUBLICATIONS

Alcatel-Lucent, "Comparison of Different SN handling at Layer 2", Aug. 2007.*
Alcatel-Lucent: "Comparison of different SN handling at Layer 2" 3GPP Draft; R2-073455 Comparison of Different Sn Handling At Layer 2, SRD Generation Partnership Project (3GPP), Mobile Competence Centre; 650, Route Des Lucioles; F-06921 Sophia-Antipolis Cedex; France, vol. RAN WG2, no. Athens, Greece; 20070815, Aug. 15, 2007, XP050136160 [retrieved on Aug. 15, 2007] p. 1—p. 2 p. 5—p. 6.
International Search Report and Written Opinion—PCT/US2009/069310, International Search Authority—European Patent Office—Aug. 13, 2010.
Alcatel-Lucent: "Comparison of different SN handling at Layer 2", 3GPP TSG RAN WG2 Meeting R2-072691, Jun. 25-29, 2007 Orlando,US, Annex.
Taiwan Search Report—TW098144284—TIPO—Mar. 23, 2013.

* cited by examiner

*Primary Examiner* — Omer S Mian
(74) *Attorney, Agent, or Firm* — Nerrie M. Zohn

(57) ABSTRACT

Techniques for bundling and ciphering data prior to transmission are described. In an exemplary design, a transmitting entity receives a plurality of service data units (SDUs) from an upper layer, assigns sequential sequence numbers to the SDUs, and bundles the SDUs into a single protocol data unit (PDU). In one design, the transmitting entity generates a single count value based on a sequence number of a designated SDU (e.g., the first SDU) in the PDU and ciphers all SDUs based on the single count value. In another design, the transmitting entity ciphers each segment of at least two SDUs in the PDU based on a count value for that segment. The transmitting entity generates a header with at least one sequence number and possibly length and/or other information for the SDUs. The transmitting entity forms the PDU with the header and the SDUs and passes the PDU to a lower layer.

16 Claims, 11 Drawing Sheets

METHOD AND APPARATUS FOR BUNDLING AND CIPHERING DATA

The present application claims priority to provisional U.S. Application Ser. No. 61/139,930, entitled "Packet Bundling at the PDCP Layer with Ciphering on the Bundled Packet," filed Dec. 22, 2008, assigned to the assignee hereof and incorporated herein by reference.

BACKGROUND

I. Field

The present disclosure relates generally to communication, and more specifically to techniques for transmitting and receiving data in a communication network.

II. Background

Communication networks are widely deployed to provide various communication content such as voice, video, packet data, messaging, broadcast, etc. These networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A communication network may include a number of base stations that can support communication for a number of user equipments (UEs). A base station may transmit data to a UE on the downlink and/or receive data from the UE on the uplink. For each link, a transmitting entity may cipher data prior to transmission in order to provide security for over-the-air transmission of the data. Ciphering may be especially desirable for sensitive data such as personal information, credit card information, account information, etc. A receiving entity may decipher the ciphered data to recover the original data. It may be desirable to efficiently transmit and receive data with ciphering.

SUMMARY

Techniques for bundling and ciphering data prior to transmission in a communication network are described herein. Bundling data and ciphering the bundled data may provide various advantages, as described below. In an exemplary design, a transmitting entity for a protocol in a given layer may receive a plurality of service data units (SDUs) from an upper layer, assign sequential sequence numbers to the SDUs, and bundle the SDUs into a single protocol data unit (PDU). In one design, the transmitting entity may generate a single count value based on a sequence number of a designated SDU (e.g., the first SDU) in the PDU and may cipher all SDUs based on the single count value. In another design, the transmitting entity may cipher each segment of at least two SDUs in the PDU based on a count value for that segment. The transmitting entity may generate a header comprising at least one sequence number and possibly length and/or other information for the SDUs. The transmitting entity may form the PDU comprising the header and the ciphered SDUs and may pass the PDU to a lower layer.

A receiving entity may perform the complementary processing to unbundle and decipher the SDUs in the PDU. Various aspects and features of the disclosure are described in further detail below.

DETAILED DESCRIPTION

The techniques described herein may be used for various wireless and wireline communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the networks and radio technologies mentioned above as well as other networks and radio technologies. For clarity, certain aspects of the techniques are described below for LTE, and LTE terminology is used in much of the description below.

Figure 1:
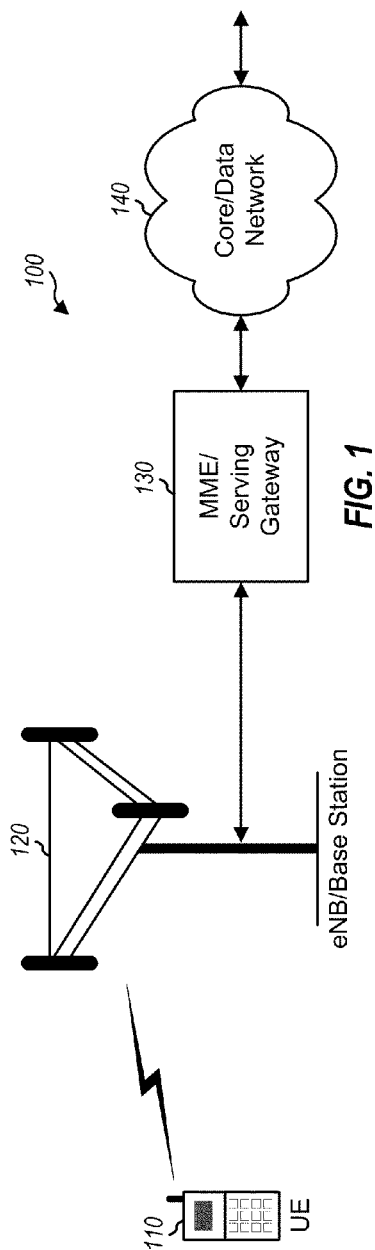
FIG. 1 shows a wireless communication network.

FIG. 1 shows a wireless communication network 100, which may be an LTE network or some other network. Network 100 may include a number of evolved Node Bs (eNBs) and other network entities described by 3GPP. For simplicity, only one eNB 120 and one Mobility Management Entity (MME)/serving gateway 130 are shown in FIG. 1. An eNB may be a station that communicates with the UEs and may also be referred to as a base station, a Node B, an access point, etc. Serving gateway 130 may support data services such as packet data, voice-over-Internet Protocol (VoIP), video, messaging, etc. MME 134 may be responsible for mobility management, path switching between eNBs at handover, paging, etc. MME/serving gateway 130 may couple to a core and/or data network 140 (e.g., the Internet) and may communicate with other entities (e.g., remote servers and terminals) that couple to core/data network 140.

A UE 110 may communicate with eNB 120 via lower layers and may also communicate with MME/serving gateway 130 via upper layers. UE 110 may also be referred to as a mobile station, a terminal, an access terminal, a subscriber unit, a station, etc. UE 110 may be a cellular phone, a personal digital assistant (PDA), a wireless modem, a wireless communication device, a handheld device, a laptop computer, a cordless phone, a wireless local loop (WLL) station, etc.

Figure 2:
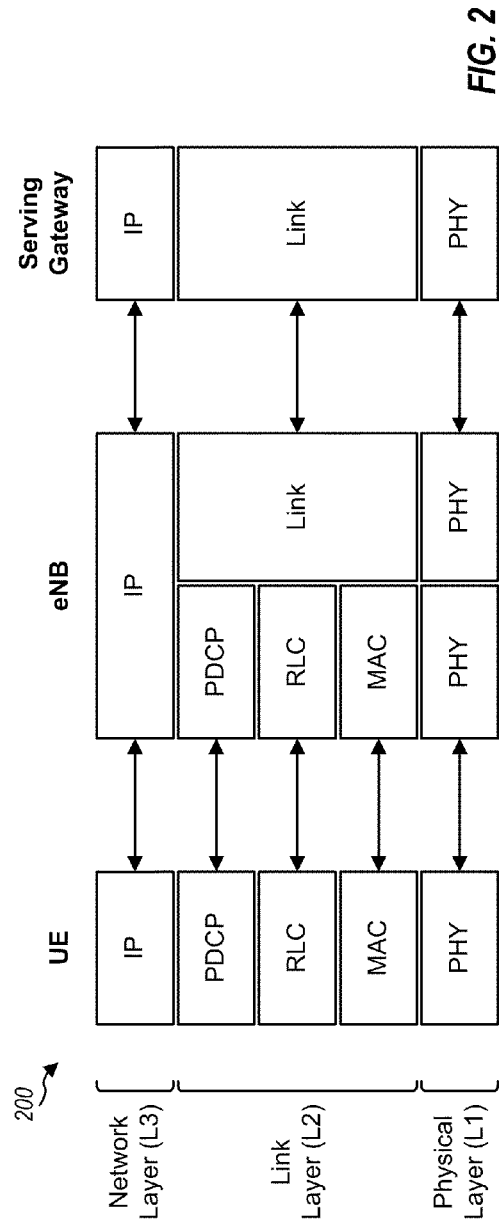
FIG. 2 shows exemplary protocol stacks for various entities.

FIG. 2 shows exemplary protocol stacks 200 for a user plane in LTE. The user plane carries traffic data between UE 110 and serving gateway 130 via serving eNB 120. Each entity maintains a protocol stack for communication with another entity. Each protocol stack typically includes a network layer (Layer 3 or L3), a link layer (Layer 2 or L2), and a physical layer (Layer 1, L1 or PHY). UE 110 and serving gateway 130 may exchange data using Internet Protocol (IP) at the network layer. Upper layer data may be encapsulated in IP packets, which may be exchanged between UE 110 and serving gateway 130 via serving eNB 120.

The link layer is typically dependent on network/radio technology. For the user plane in LTE, the link layer for UE 110 comprises three sublayers for Packet Data Convergence Protocol (PDCP), Radio Link Control (RLC), and Medium Access Control (MAC), which are terminated at eNB 120. UE 110 further communicates with eNB 120 via E-UTRA airlink interface at the physical layer. eNB 120 may communicate with serving gateway 130 via IP and a technology-dependent interface for the link and physical layers.

PDCP may perform various functions such as compression of upper layer protocol headers, ciphering and integrity protection of data for security, etc. Ciphering is also referred to as encryption, scrambling, etc. The functions performed by PDCP may be provided by equivalent protocols in other radio technologies. For example, an IP adaptation layer in cdma2000 may perform functions similar to those performed by PDCP. PDCP is described in 3GPP TS 36.323, entitled "Evolved Universal Terrestrial Radio Access (E-UTRA); Packet Data Convergence Protocol (PDCP) Specification," which is publicly available.

Figure 3:
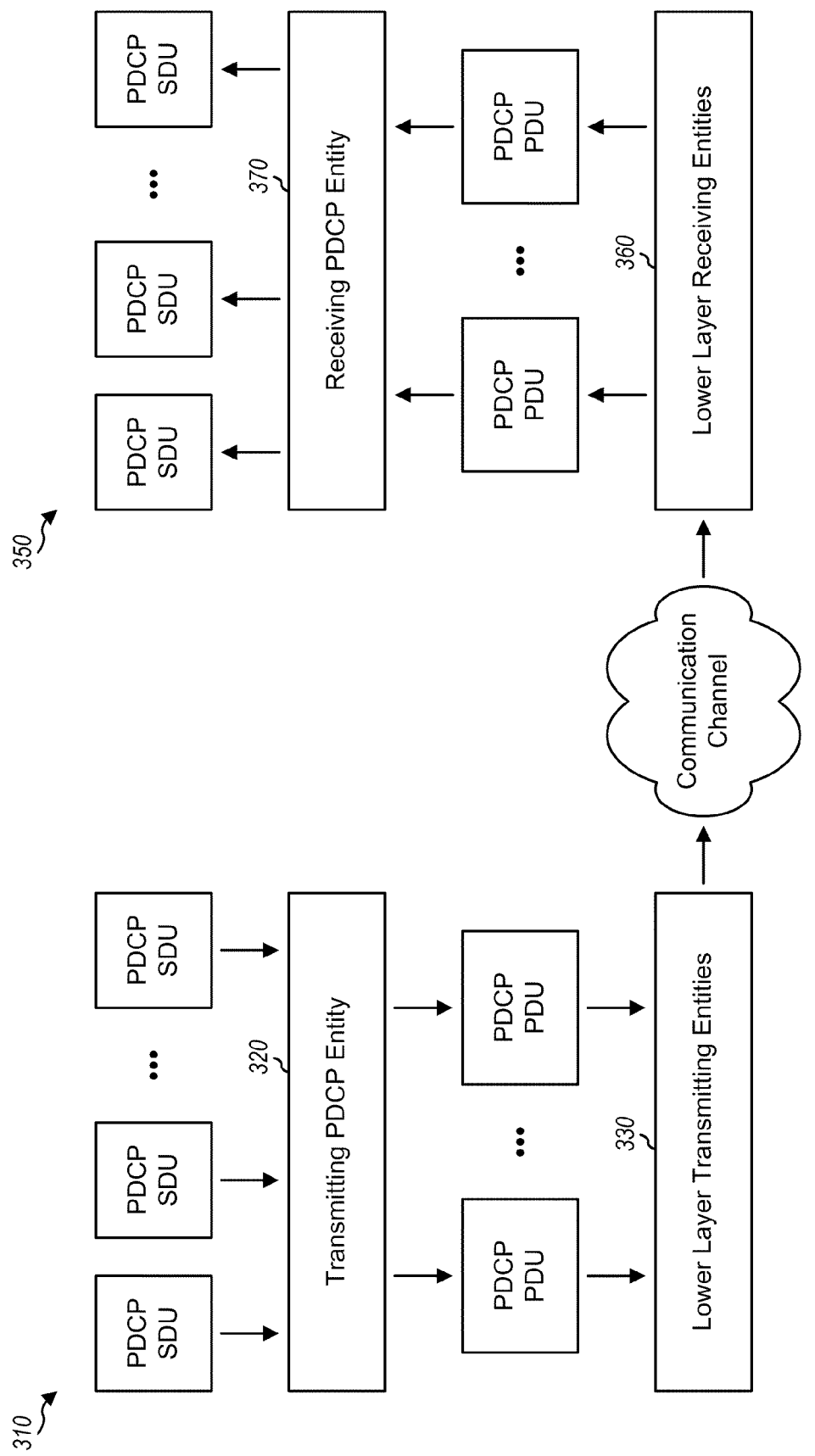
FIG. 3 shows exemplary data transmission and reception.

FIG. 3 shows data transmission by a transmitter 310 and data reception by a receiver 350 via PDCP. For data transmission on the downlink, transmitter 310 may be eNB 120, and receiver 350 may be UE 110. For data transmission on the uplink, transmitter 310 may be UE 110, and receiver 350 may be eNB 120.

At transmitter 310, a transmitting PDCP entity 320 may receive PDCP SDUs from upper layer, process the PDCP SDUs as described below, and provide PDCP PDUs to lower layer. In general, for a given protocol in a given layer, an SDU refers to a data unit received by the protocol from a layer above, and a PDU refers to a data unit provided by the protocol to a layer below. The term "upper layer" refers to a layer above a given layer, and the term "lower layer" refers to a layer below the given layer. There may or may not be a one-to-one mapping between SDUs and PDUs. Each PDCP SDU may correspond to one or more IP packets or some other data units from a protocol above PDCP. Each PDCP PDU may correspond to an RLC SDU or some other data unit provided to a protocol below PDCP. Transmitting entities 330 for lower layer protocols (e.g., RLC, MAC and PHY) may further process the PDCP PDUs and generate a signal, which may be transmitted via a communication channel.

At receiver 350, receiving entities 360 for lower layer protocols may receive the signal from transmitter 310, process the received signal, and provide PDCP PDUs. A receiving PDCP entity 370 may receive PDCP PDUs from receiving entities 360, process the PDCP PDUs as described below, and provide PDCP SDUs to upper layer at receiver 350.

Conventionally, each PDCP SDU is mapped to one PDCP PDU. The transmitting PDCP entity may assign a sequentially increasing PDCP sequence number (SN) to each incoming PDCP SDU from upper layer. The transmitting PDCP entity may perform header compression, ciphering, and integrity protection for each PDCP SDU and may provide a corresponding PDCP PDU. For ciphering, the transmitting PDCP entity may determine a COUNT value for each PDCP SDU and may perform ciphering for the PDCP SDU based on the COUNT value.

Figure 4:
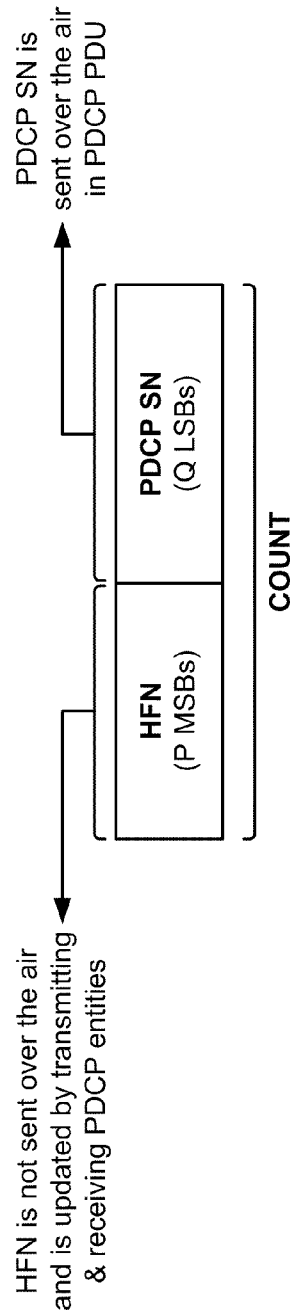
FIG. 4 shows a format of a COUNT parameter.

FIG. 4 shows the format of the COUNT in LTE. The COUNT is a 32-bit value composed of a P-bit hyper-frame number (HFN) and a Q-bit PDCP SN, where P and Q may be configurable values. The HFN occupies the P most significant bits (MSBs) of the COUNT, and the PDCP SN occupies the Q least significant bits (LSBs) of the COUNT. Q determines the size of the PDCP SN space. In one configuration, the 32-bit COUNT is composed of a 20-bit HFN and a 12-bit PDCP SN. In another configuration, the 32-bit COUNT is composed of a 25-bit HFN and a 7-bit PDCP SN. The PDCP SN is incremented for each new PDCP SDU and wraps around to zero after reaching a maximum value. The HFN is incremented whenever the PDCP SN wraps around to zero. The PDCP SN is sent over the air, and the HFN is not sent over the air in order to reduce overhead. The transmitting and receiving PDCP entities may each maintain the HFN.

Figure 5B:
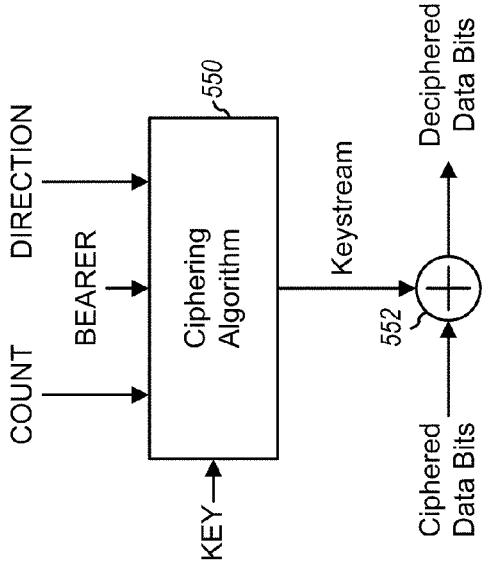
FIG. 5B shows deciphering by a receiving entity.
Figure 5A:
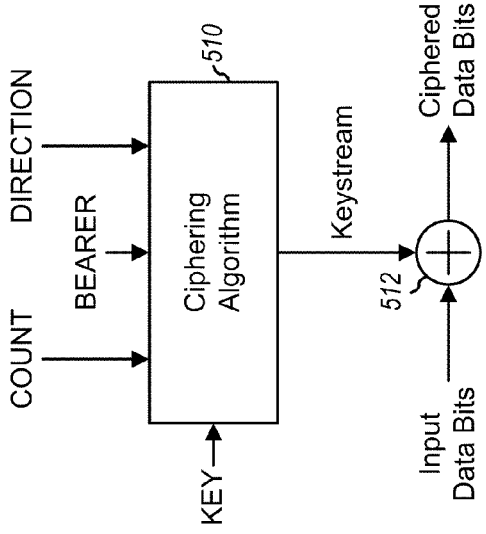
FIG. 5A shows ciphering by a transmitting entity.

FIG. 5A shows ciphering by the transmitting PDCP entity. A unit 510 receives various parameters such as KEY, COUNT, BEARER and DIRECTION. The KEY comprises a cipher key used for ciphering data. The COUNT is a cryptosync that acts as a time-variant input for a ciphering algorithm. The BEARER indicates a data radio bearer (DRB) of the data being ciphered. The DIRECTION comprises a bit that may be set to '0' for uplink transmission or to '1' for downlink transmission. Unit 510 generates a keystream based on all of the parameters and in accordance with a ciphering algorithm defined by LTE. An exclusive-OR gate 512 performs bit-wise modulo-2 addition of the keystream bits from unit 510 and input data bits for a PDCP SDU and provides ciphered data bits for the PDCP SDU.

FIG. 5B shows deciphering by the receiving PDCP entity. A unit 550 receives the KEY, COUNT, BEARER and DIRECTION parameters. Unit 550 generates a keystream based on all of the parameters and in similar manner as unit 510 at the transmitting PDCP entity. An exclusive-OR gate 552 performs bit-wise modulo-2 addition of the keystream bits from unit 550 and the ciphered data bits for a PDCP SDU and provides deciphered data bits for the PDCP SDU.

In an aspect, multiple PDCP SDUs may be bundled and ciphered to form a PDCP PDU. Bundling PDCP SDUs and ciphering the bundled PDCP SDUs may provide various advantages. First, the rate of PDCP PDUs may be reduced due to bundling, which may reduce processing requirements for RLC in lower layer. Second, ciphering the bundled PDCP SDUs may simplify ciphering, e.g., due to fewer calls to a ciphering engine as well as simpler processing for ciphering. Third, header overhead may be reduced at RLC due to bundling at PDCP. Other advantages may also be obtained due to bundling and ciphering PDCP SDUs.

Figure 6:
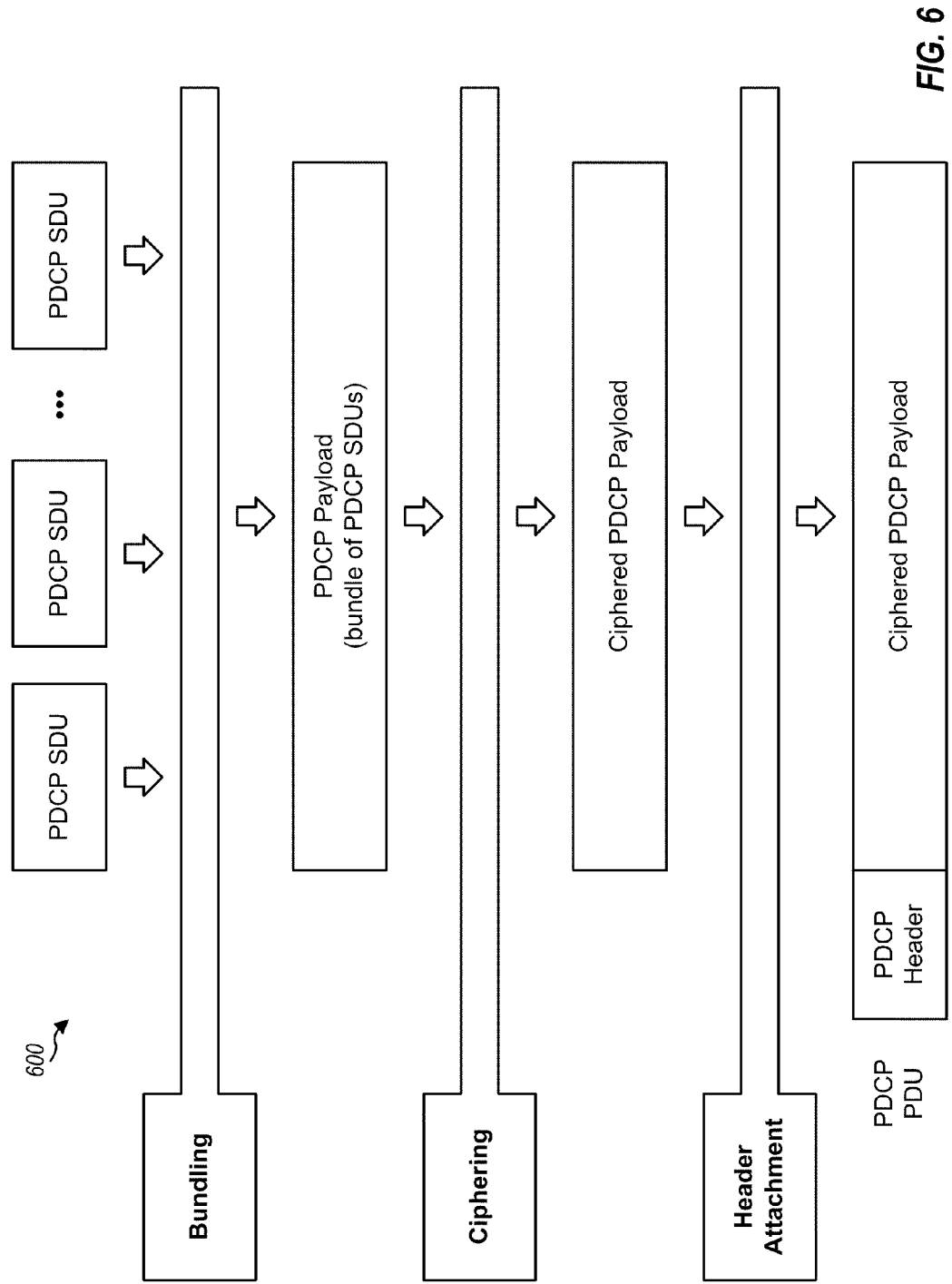
FIG. 6 shows a design of bundling and ciphering SDUs.

FIG. 6 shows an exemplary design of a process 600 for bundling and ciphering PDCP SDUs. Multiple PDCP SDUs received from upper layer may be bundled into a PDCP payload, which may also be referred to as a bundle. Each PDCP SDU may be assigned a different PDCP SN to enable retransmission of that PDCP SDU. The PDCP payload may be ciphered to obtain a ciphered PDCP payload. A PDCP header may be generated for all PDCP SDUs in the bundle and may be appended to the ciphered PDCP payload to form a PDCP PDU. The PDCP PDU may be provided to lower layer for further processing and transmission.

FIG. 6 shows an exemplary design of generating a PDCP PDU with bundling. The processing shown in FIG. 6 may also be performed in other manners. For example, a PDCP header may be appended to a PDCP payload, and the resultant data may be ciphered to obtain a PDCP PDU. Ciphering of a bundle of PDCP SDUs may be performed in various manners.

Figure 7A:
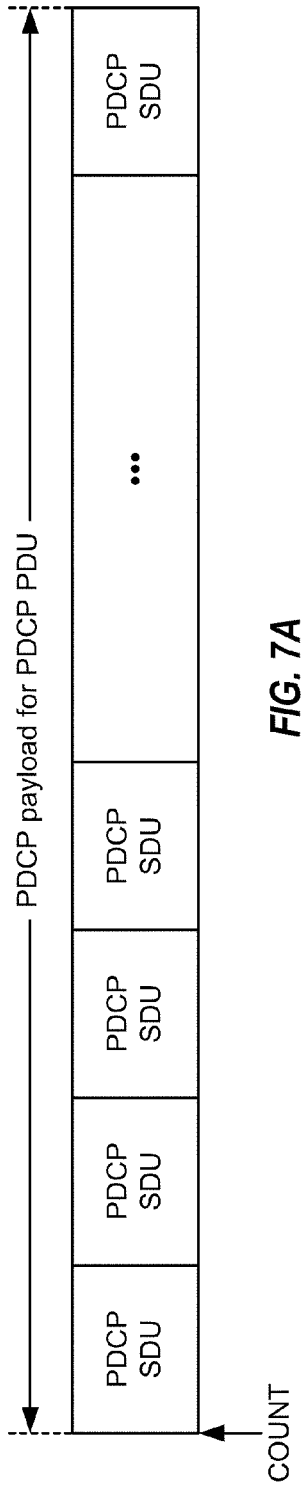
FIG. 7A shows ciphering of all SDUs based on a single COUNT value.

FIG. 7A shows a first ciphering design in which all PDCP SDUs in a bundle are ciphered based on a single COUNT value. This COUNT value may be formed based on a PDCP SN and an HFN of a designated PDCP SDU in the bundle. The designated PDCP SDU may be the first PDCP SDU, the last PDCP SDU, or some other PDCP SDU in the bundle. The designated PDCP SDU may be known a priori by the transmitting and receiving PDCP entities (e.g., specified in a standard), or may be configured at PDCP establishment, or may be conveyed in other manners. The PDCP SN used to form the COUNT value may be sent in the PDCP header, so that the receiving PDCP entity can form the same COUNT value for deciphering the PDCP SDUs in the bundle.

Figure 7B:
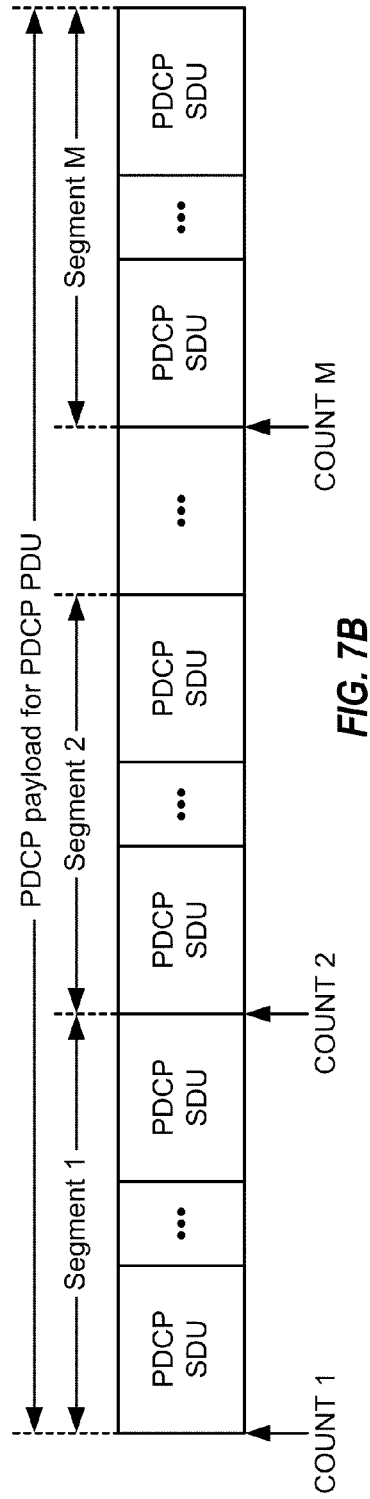
FIG. 7B shows ciphering of segments of SDUs.

FIG. 7B shows a second ciphering design in which a bundle of PDCP SDUs is partitioned into segments, with each segment including two or more PDCP SDUs. The PDCP SDUs in each segment may be ciphered based on a COUNT value for that segment. The COUNT value for each segment may be formed based on a PDCP SN and an HFN of a designated PDCP SDU in that segment. The designated PDCP SDU may be the first PDCP SDU, the last PDCP SDU, or some other PDCP SDU in the segment. In one design, the PDCP SN for only one PDCP SDU (e.g., the first PDCP SDU in the first segment) and segment information may be sent in a PDCP header. The segment information may include the size of each segment (e.g., in number of PDCP SDUs) and/or other information. The PDCP SN of the designated PDCP SDU in each segment (and hence the COUNT value for each segment) may be determined based on the PDCP SN and the segment information sent in the PDCP header. For example, the PDCP SN for the m-th segment may be determined as $(X+m \cdot L) \bmod N$, where X is the PDCP SN for the first segment, L is the number of PDCP SDUs in each segment, N is the maximum PDCP SN value, and "mod" denotes a modulo operation. In another design, the PDCP SN of a designated PDCP SDU (e.g., the first PDCP SDU) in each segment may be sent in the PDCP header. In this design, the COUNT value for each segment may be determined based on the PDCP SN sent in the PDCP header for that segment.

In one design, only the PDCP payload may be ciphered, and the PDCP header may be sent without ciphering. In another design, the PDCP payload and part of the PDCP header may be ciphered, and the PDCP SN(s) in the PDCP header may be sent without ciphering. In general, some or none of the PDCP header may be ciphered. The PDCP SN(s) may be sent without ciphering to allow the receiving PDCP entity to compute the COUNT value(s) and perform deciphering.

Exemplary flow diagrams for transmitting and receiving PDCP SDUs with bundling and ciphering are described below. Table 1 lists a set of variables that may be used to transmit and receive PDCP SDUs with bundling and ciphering.

TABLE 1

| Variable | Description |
| --- | --- |
| Next_PDCP_TX_SN | Indicates the PDCP SN of the next PDCP SDU at the transmitting PDCP entity. Is set to 0 at PDCP establishment. |
| Next_PDCP_RX_SN | Indicates the next PDCP SN expected by the receiving PDCP entity. Is set to 0 at PDCP establishment. |
| TX_HFN | Indicates an HFN value for generating a COUNT value by the transmitting PDCP entity. Is set to 0 at PDCP establishment. |
| RX_HFN | Indicates an HFN value for generating a COUNT value by the receiving PDCP entity. Is set to 0 at PDCP establishment. |
| Maximum_PDCP_SN | Maximum value of the PDCP SN. |
| PDCP_SN[k] | PDCP SN for the k-th PDCP SDU in a bundle. |
| HFN[k] | HFN for the k-th PDCP SDU in the bundle. |
| NumSDUs | Number of PDCP SDUs in the bundle. |

The transmitting PDCP entity may maintain variables Next_PDCP_TX_SN, TX_HFN, PDCP_SN[k] and HFN[k], for k=1 to K, where K=NumSDUs. The receiving PDCP entity may maintain variables Next_PDCP_RX_SN, RX_HFN, PDCP_SN[k] and HFN[k], for k=1 to K. In one design, NumSDUs may be configured at PDCP establishment and may be fixed for all bundles. In another design, NumSDUs may change dynamically (e.g., from bundle to bundle) and may be conveyed in the PDCP header. Maximum_PDCP_SN may be configured at PDCP establishment and may thus be known by both the transmitting and receiving PDCP entities.

Figure 8:
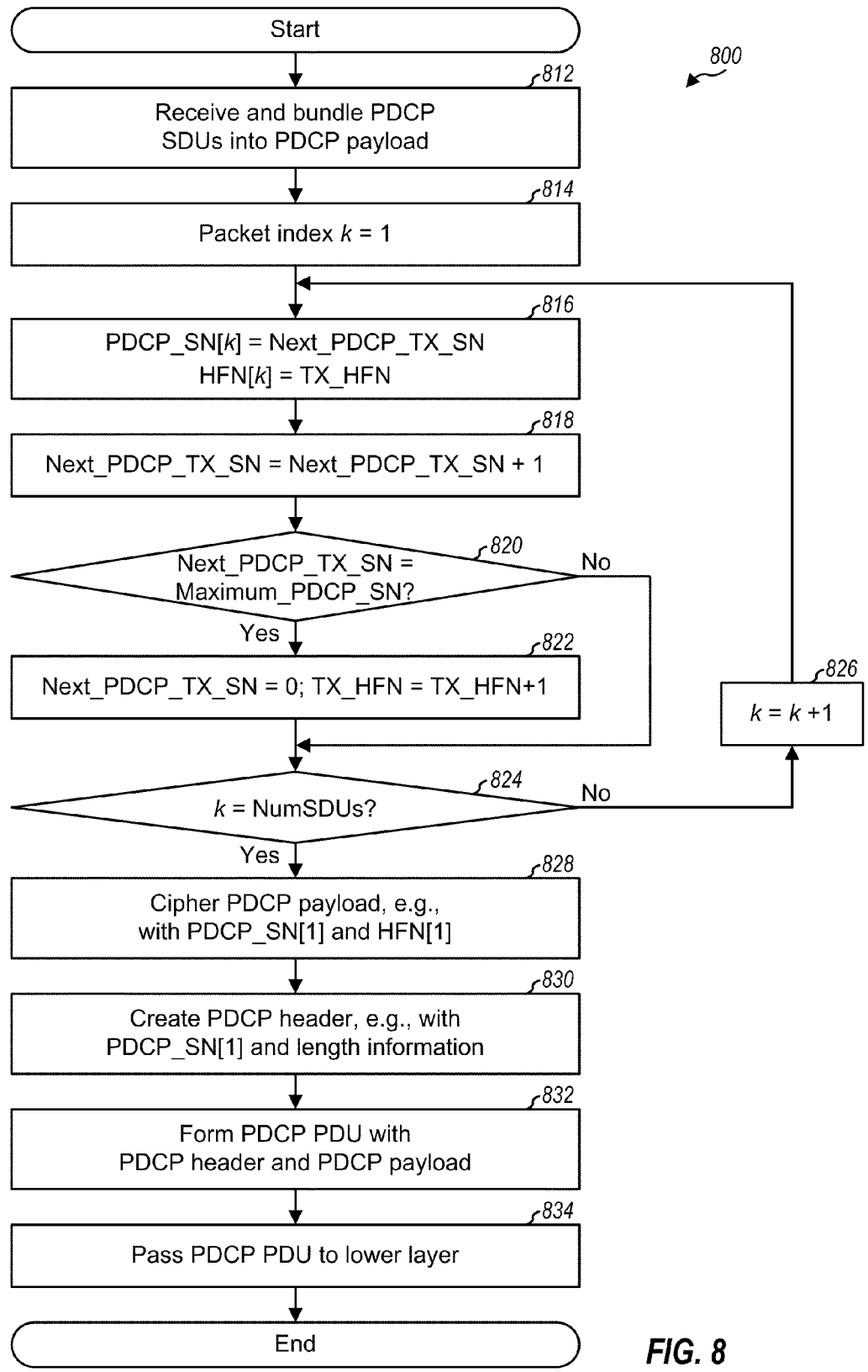
FIG. 8 shows a process for bundling and ciphering SDUs.

FIG. 8 shows a design of a process 800 performed by the transmitting PDCP entity for bundling and ciphering PDCP SDUs. The transmitting PDCP entity may reside in eNB 120 for data transmission on the downlink or in UE 120 for data transmission on the uplink. The transmitting PDCP entity may receive PDCP SDUs from upper layer and may bundle these PDCP SDUs into a PDCP payload or a bundle (block 812). The transmitting PDCP entity may concatenate PDCP SDUs as they are received, e.g., until the PDCP payload includes NumSDUs PDCP SDUs. The position of the PDCP SDUs in the PDCP payload may be dependent on the order of their arrival at the transmitting PDCP entity.

The transmitting PDCP entity may determine the HFN and the PDCP SN of each PDCP SDU in the PDCP payload. A packet index k used to keep track of the PDCP SDUs in the PDCP payload may be initialized to 1 (block 814). The PDCP SN for the first PDCP SDU in the PDCP payload may be set to Next_PDCP_TX_SN, and the HFN for this PDCP SDU may be set to TX_HFN (block 816). Next_PDCP_TX_SN may then be incremented by one (block 818).

The transmitting PDCP entity may then determine whether Next_PDCP_TX_SN has reached the maximum value for the PDCP SN (block 820). If the answer is 'Yes', then Next_PDCP_TX_SN may be reset to 0, and TX_HFN may be incremented by one (block 822). If the answer is 'No' for block 820 and also after block 822, the transmitting PDCP entity may determine whether packet index k is equal to NumSDUs (block 824). If the answer is 'No', indicating that all PDCP SDUs in the PDCP payload have not been assigned PDCP SNs, then packet index k may be incremented (block 826). The transmitting PDCP entity may then return to block 816 to assign PDCP SN to the next PDCP SDU in the PDCP payload.

If the answer is 'Yes' for block 824, indicating that all PDCP SDUs in the PDCP payload have been assigned PDCP SNs, then the transmitting PDCP entity may cipher the PDCP payload (block 830). For the first ciphering design shown in FIG. 7A, the transmitting PDCP entity may generate a COUNT value based on PDCP_SN[1] and HFN[1] for the first PDCP SDU and may cipher all PDCP SDUs in the PDCP payload based on this COUNT value. For the second ciphering design shown in FIG. 7B, the transmitting PDCP entity may form a COUNT value for each segment based on the PDCP_SN and the HFN for a designated PDCP SDU in that segment and may cipher all PDCP SDUs in the segment based on the COUNT value.

The transmitting PDCP entity may create a PDCP header for the PDCP payload (block 832). The format of the PDCP header may be dependent on how ciphering is performed and may include the PDCP SN of a designated PDCP SDU and length information, as described below. The transmitting PDCP entity may form a PDCP PDU by appending the PDCP header to the PDCP payload (block 832). The transmitting PDCP entity may then pass the PDCP PDU to lower layer (block 834).

In the design shown in FIG. 8, the PDCP SDUs in the bundle are assigned contiguous PDCP SNs. The PDCP SN and the HFN for each PDCP SDU in the bundle may be determined and stored in arrays PDCP_SN[k] and HFN[k] in block 816. The PDCP SNs and the HFNs in these two arrays may be used for retransmission of PDCP SDUs received in error by the receiving PDCP entity. This may be the case, e.g., during handover from a source eNB to a target eNB.

FIG. 8 shows an exemplary design of bundling and ciphering PDCP SDUs for a PDCP PDU. The entire PDCP payload may be ciphered with a single COUNT value, and the PDCP SN used to form this COUNT value may be sent in the PDCP header, as shown in FIG. 8. Ciphering may also be performed for each segment of the PDCP payload, as described above. The transmitting PDCP entity may also perform bundling and ciphering in other manners. For example, the transmitting PDCP entity may cipher the length information. The transmitting PDCP entity may also perform other actions, e.g., perform header compression before ciphering.

Figure 9A:
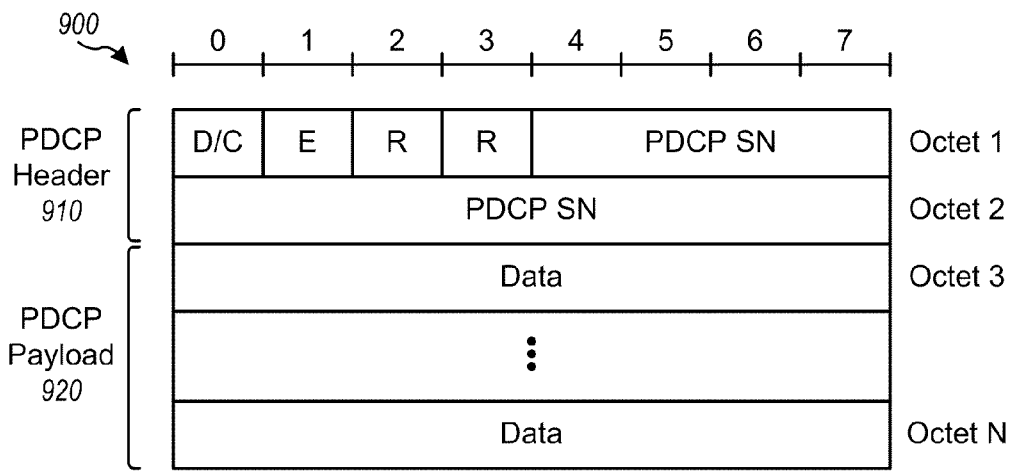
FIG. 9A shows a PDU comprising a single SDU.

FIG. 9A shows an exemplary PDCP PDU 900 comprising a single PDCP SDU. PDCP PDU 900 includes a PDCP header 910 and a PDCP payload 920. PDCP header 910 includes a data/control (D/C) bit that indicates whether data or control information is sent in the PDCP PDU, an extension (E) bit that indicates whether additional fields are included in the PDCP header, and two reserved (R) bits. PDCP header 910 further includes a field for a PDCP SN of the PDCP SDU sent in the PDCP PDU. PDCP payload 920 includes data for the PDCP SDU.

Figure 9B:
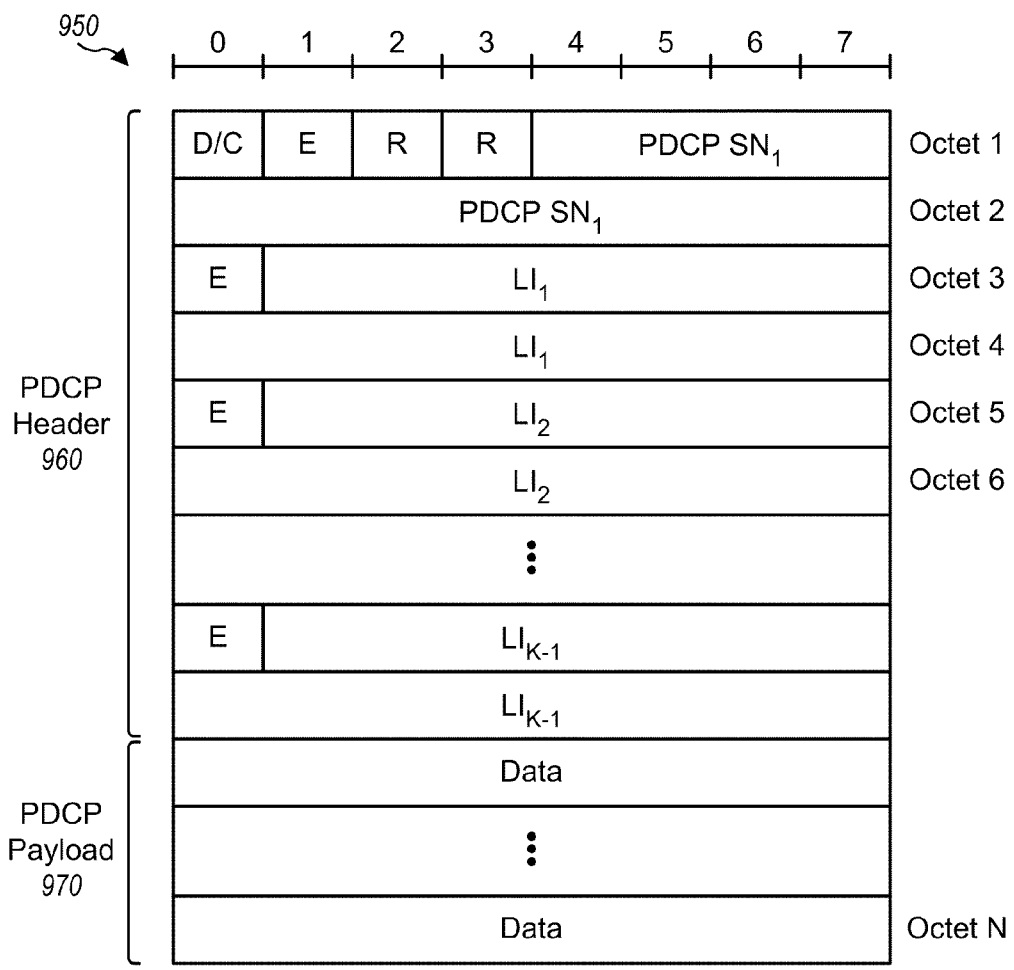
FIG. 9B shows a PDU comprising a bundle of SDUs.

FIG. 9B shows a design of a PDCP PDU 950 comprising a bundle of K PDCP SDUs, where K is equal to NumSDUs and is greater than one. PDCP PDU 950 includes a PDCP header 960 and a PDCP payload 970. PDCP header 960 includes a data/control bit, an extension bit, and two reserved bits. The extension bit may be set to a first value (e.g., '0') for a PDCP PDU with a single PDCP SDU or to a second value (e.g., '1') for a PDCP PDU with multiple PDCP SDUs. PDCP header 960 further includes a field for a PDCP SN of a designated PDCP SDU, e.g., PDCP $SN_1$ for the first PDCP SDU. PDCP header 960 also includes K−1 sets of fields for length information for the first K−1 PDCP SDUs in the PDCP PDU. Each set of fields includes an extension (E) bit and a length field. The extension (E) bit may be set to (i) a first value (e.g., '0') to indicate that no more length information will follow or (ii) a second value (e.g., '1') to indicate that additional length information will follow. The extension field may be used to send a variable number of PDCP SDUs in the PDCP PDU. The length field includes length information for an associated PDCP SDU, where $LI_k$ denotes the length information for the k-th PDCP SDU. The length information may be used to unbundle each PDCP SDU from PDCP payload 970. PDCP payload 970 includes data for all K PDCP SDUs.

In the design shown in FIG. 9B, PDCP PDU 950 includes a single PDCP SN. This PDCP SN may be used to generate a single COUNT value for deciphering the entire PDCP payload. This single PDCP SN may also be used to generate a COUNT value for each segment of the PDCP PDU, as described above.

A PDCP PDU comprising a bundle of K PDCP SDUs may also be sent using other formats, which may be different from the format shown in FIG. 9B. For example, a PDCP header for a PDCP PDU may include a PDCP SN for each segment, a segment size, etc. The length information may be excluded from the PDCP header if all PDCP SDUs have equal size, which may be known a priori by the transmitting and receiving PDCP entities. The field sizes may also be different from the sizes shown in FIG. 9B.

Figure 10:
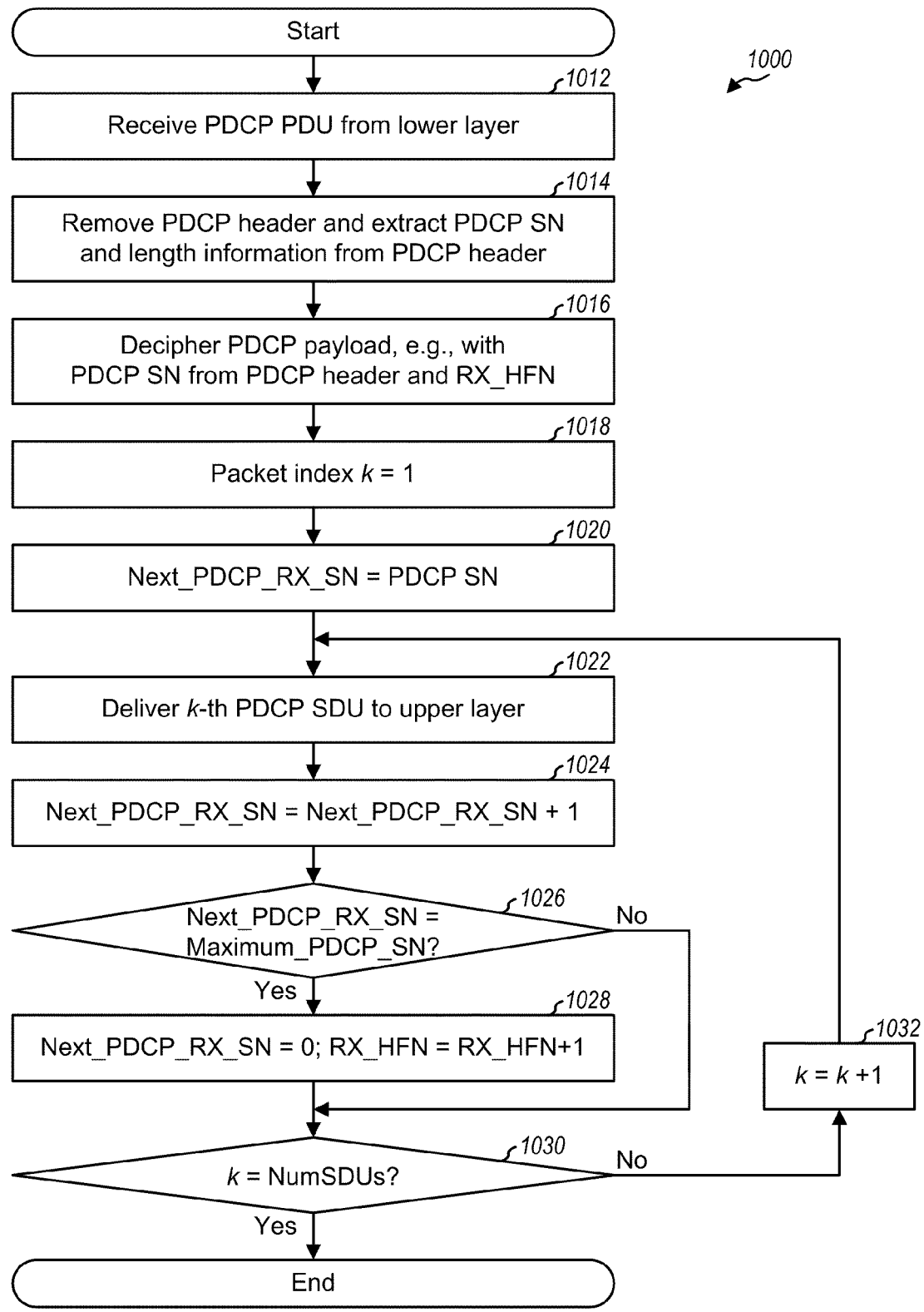
FIG. 10 shows a process for unbundling and deciphering SDUs.

FIG. 10 shows a design of a process 1000 performed by the receiving PDCP entity for unbundling and deciphering SDUs in a PDCP PDU. The receiving PDCP entity may reside in UE 110 for data transmission on the downlink or in eNB 120 for data transmission on the uplink. The receiving PDCP entity may receive a PDCP PDU comprising a bundle of PDCP SDUs from lower layer (block 1012). The receiving PDCP entity may remove the PDCP header from the PDCP PDU and may obtain a PDCP SN and length information for the PDCP SDUs in the PDCP PDU (block 1014).

The receiving PDCP entity may then decipher the PDCP payload, e.g., based on the PDCP SN obtained from the PDCP header and the RX_HFN maintained by the receiving PDCP entity (block 1016). The receiving PDCP entity may perform deciphering in a manner complementary to the ciphering performed by the transmitting PDCP entity. For the first ciphering design shown in FIG. 7A, the receiving PDCP entity may decipher all PDCP SDUs in the PDCP payload based on a single COUNT value, which may be determined based on the PDCP SN from the PDCP header and the RX_HFN. For the second ciphering design shown in FIG. 7B, the receiving PDCP entity may decipher each segment of at least two PDCP SDUs in the PDCP payload based on a COUNT value for that segment. The COUNT value for each segment may be determined based on the RX_HFN and either (i) the PDCP SN obtained from the PDCP header for that segment or (ii) the single PDCP SN and segment information obtained from the PDCP header. The receiving PDCP entity may also decipher each PDCP SDU as it is received from lower layer instead of waiting for the entire PDCP payload to be received.

The receiving PDCP entity may unbundle the PDCP SDUs in the PDCP PDU and may determine the PDCP SN and HFN for each PDCP SDU. A packet index k used to keep track of the PDCP SDUs in the PDCP PDU may be initialized to 1 (block 1018). For the design in which the PDCP SN of the first PDCP SDU is sent in the PDCP header, Next_PDCP_RX_SN may be set to the PDCP SN obtained from the PDCP header (block 1020). The receiving PDCP entity may deliver the k-th PDCP SDU in the PDCP PDU to upper layer (block 1022). The receiving PDCP entity may use the length information in the PDCP header to determine the boundary of the k-th PDCP SDU in the PDCP payload.

The receiving PDCP entity may then increment Next_PDCP_RX_SN by one (block 1024) and may determine whether Next_PDCP_RX_SN has reached the maximum value for the PDCP SN (block 1026). If the answer is 'Yes', then Next_PDCP_RX_SN may be reset to 0, and RX_HFN may be incremented by one (block 1028). If the answer is 'No' for block 1026 and also after block 1028, the receiving PDCP entity may determine whether packet index k is equal to NumSDUs (block 1030). For the design shown in FIG. 9B, NumSDUs may be equal to the number of length fields in the PDCP header plus one. In other designs, NumSDUs may be configured (e.g., at PDCP establishment) or conveyed in other manners. If the answer is 'No' for block 1030, indicating that all PDCP SDUs in the PDCP payload have not been unbundled and passed to upper layer, then packet index k may be incremented (block 1032). The receiving PDCP entity may then return to block 1022 to unbundle the next PDCP SDU from the PDCP PDU and pass it up to upper layer. If the answer is 'Yes' for block 1030, indicating that all PDCP SDUs in the PDCP PDU have been unbundled and passed to upper layer, then the receiving PDCP entity may terminate the processing for the PDCP PDU.

Although not shown in FIG. 10, the receiving PDCP entity may maintain the PDCP SN and HFN for each PDCP SDU in the bundle in arrays PDCP_SN[k] and HFN[k]. The PDCP SNs and the HFNs in these two arrays may be used to request for retransmission of PDCP SDUs received in error by the receiving PDCP entity.

FIG. 10 shows an exemplary design of unbundling and deciphering a PDCP PDU comprising multiple PDCP SDUs. The entire PDCP payload may be deciphered with a single COUNT value, and the PDCP SN used to form this COUNT value may be obtained from the PDCP header, as shown in FIG. 10. Deciphering may also be performed for each segment of the PDCP payload, e.g., as the segment is received from lower layer. The receiving PDCP entity may also perform unbundling and deciphering in other manners. For example, if the length information is ciphered, then the receiving PDCP entity may perform deciphering on the PDCP payload and the length information in the PDCP header. The receiving PDCP entity may also perform other actions, e.g., perform header decompression after deciphering.

One or more modes of operation may be supported for PDCP. One mode may cover ciphering each PDCP SDU and sending the ciphered PDCP SDU in one PDCP PDU. Another mode may cover bundling multiple PDCP SDUs into one PDCP PDU and ciphering all PDCP SDUs with a single COUNT value. Yet another mode may cover bundling multiple PDCP SDUs into one PDCP PDU and ciphering each segment of at least two PDCP SDUs with a COUNT value for that segment. Other modes of operation may also be supported for PDCP.

If multiple modes of operation are supported for PDCP, then one mode may be selected for use and may be conveyed to the transmitting and receiving PDCP entities. In one design, an eNB may select the mode and inform a UE of the selected mode via common or dedicated signaling, e.g., at RRC. In another design, the selected mode may be conveyed in each PDCP PDU, e.g., via a mode field in the PDCP header.

A single mode may also be supported for PDCP, e.g., the mode in which ciphering is performed for all PDCP SDUs in a PDCP PDU with a single COUNT value. In this case, no signaling is needed to convey the mode.

A PDCP entity may be linked to an acknowledged mode (AM) or an unacknowledged mode (UM) in RLC. The acknowledged mode supports retransmission of RLC PDUs detected as being lost by a receiving RLC entity. The unacknowledged mode does not support retransmission of RLC PDUs.

During handover of an AM data radio bearer (DRB) for a UE, PDCP SDUs (e.g., for IP packets) may be forwarded between a source eNB and a target eNB for the handover. For the downlink, the source eNB may forward unacknowledged PDCP SDUs along with their PDCP_SNs to the target eNB. Since each PDCP SDU in a bundle is assigned a different PDCP_SN, bundling does not cause problems in forwarding PDCP SDUs for the downlink during handover.

For the uplink, the source eNB may forward out-of-sequence PDCP SDUs received from the UE to the target eNB. Since the PDCP SNs for all PDCP SDUs in a bundle may be determined from the PDCP SN(s) sent in the PDCP header, bundling does not cause problems in forwarding PDCP SDUs for the uplink during handover.

The bundling and ciphering techniques described herein may be used for PDCP, as described above. The techniques may also be used for other protocols, which may reside at any layer.

Figure 11:
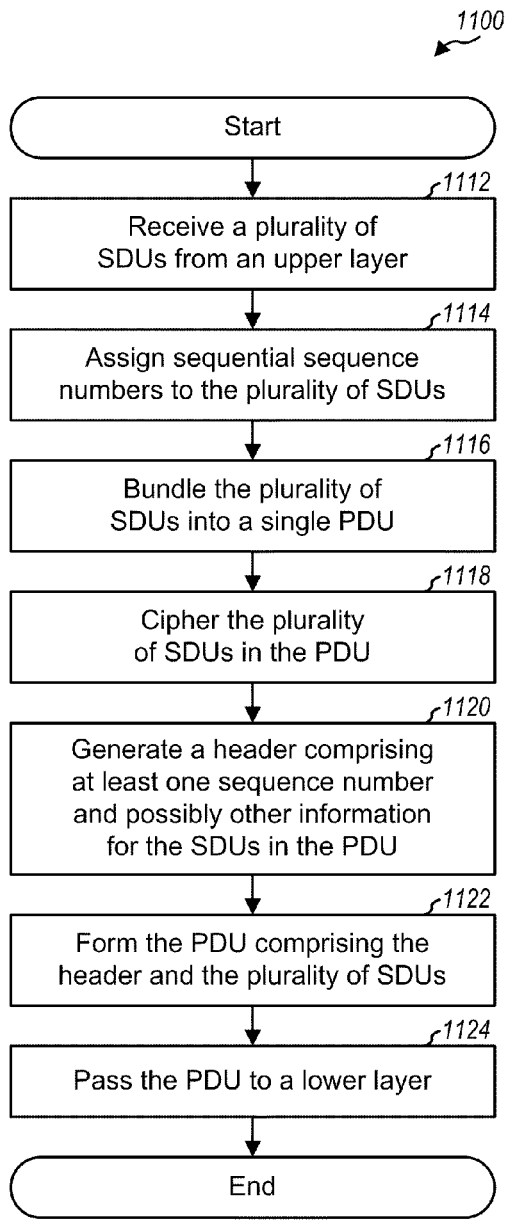
FIG. 11 shows a process for transmitting data with bundling and ciphering.

FIG. 11 shows a design of a process 1100 for transmitting data in a communication network. Process 1100 may be performed by a transmitting entity, which may be at a base station/eNB, a UE, or some other entity. The transmitting entity may receive a plurality of SDUs from an upper layer (block 1112) and may assign sequential sequence numbers to the plurality of SDUs (block 1114). The transmitting entity may bundle the plurality of SDUs into a single PDU (block 1116) and may cipher the plurality of SDUs in the PDU (block 1118). The transmitting entity may generate a header comprising at least one sequence number and possibly other information for the SDUs in the PDU (block 1120). The transmitting entity may form the PDU comprising the header and the plurality of SDUs (block 1122) and may pass the PDU to a lower layer (block 1124).

In one design of block 1118, the transmitting entity may generate a single count value based on a sequence number of a designated SDU (e.g., the first SDU) among the plurality of SDUs and may cipher all of the SDUs based on the single count value, e.g., as shown in FIG. 7A. In another design, the transmitting entity may partition the plurality of SDUs into segments, with each segment including at least two SDUs. The transmitting entity may generate a count value for each segment based on a sequence number of a designated SDU in the segment and may cipher the at least two SDUs in each segment based on the count value for the segment, e.g., as shown in FIG. 7B.

In one design of block 1120, the transmitting entity may generate the header comprising a single sequence number of a designated SDU (e.g., the first SDU) among the plurality of SDUs, e.g., as shown in FIG. 9B. In another design, the transmitting entity may generate the header comprising the sequence number of the designated SDU in each segment. For both designs, the transmitting entity may generate the header further comprising length and/or other information for one or more of the SDUs. For example, the header may further comprise an extension field and a length field for each SDU except for the last SDU, e.g., as shown in FIG. 9B. The extension field for each SDU may indicate whether length information for another SDU will follow in the header. The length field for each SDU may include length information for the SDU.

In one design of process 1100 in FIG. 11, the plurality of SDUs may be PDCP SDUs, and the PDU may be a PDCP PDU. The plurality of SDUs and the PDU may also be SDUs and PDU for some other protocol. The processing in FIG. 11 may also be performed in other orders different from the order shown in FIG. 11. For example, a header may be generated prior to ciphering, ciphering may be performed prior to bundling, etc.

Figure 12:
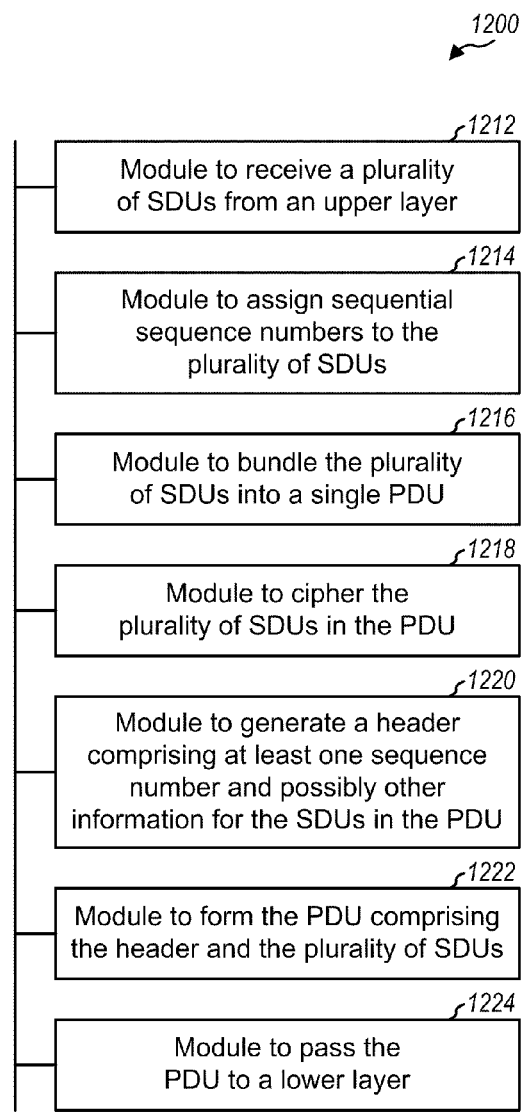
FIG. 12 shows an apparatus for transmitting data with bundling and ciphering.

FIG. 12 shows a design of an apparatus 1200 for transmitting data in a communication network. Apparatus 1200 includes a module 1212 to receive a plurality of SDUs from an upper layer, a module 1214 to assign sequential sequence numbers to the plurality of SDUs, a module 1216 to bundle the plurality of SDUs into a single PDU, a module 1218 to cipher the plurality of SDUs in the PDU, a module 1220 to generate a header comprising at least one sequence number and possibly other information for the SDUs in the PDU, a module 1222 to form the PDU comprising the header and the plurality of SDUs, and a module 1224 to pass the PDU to a lower layer.

Figures 13, 14:
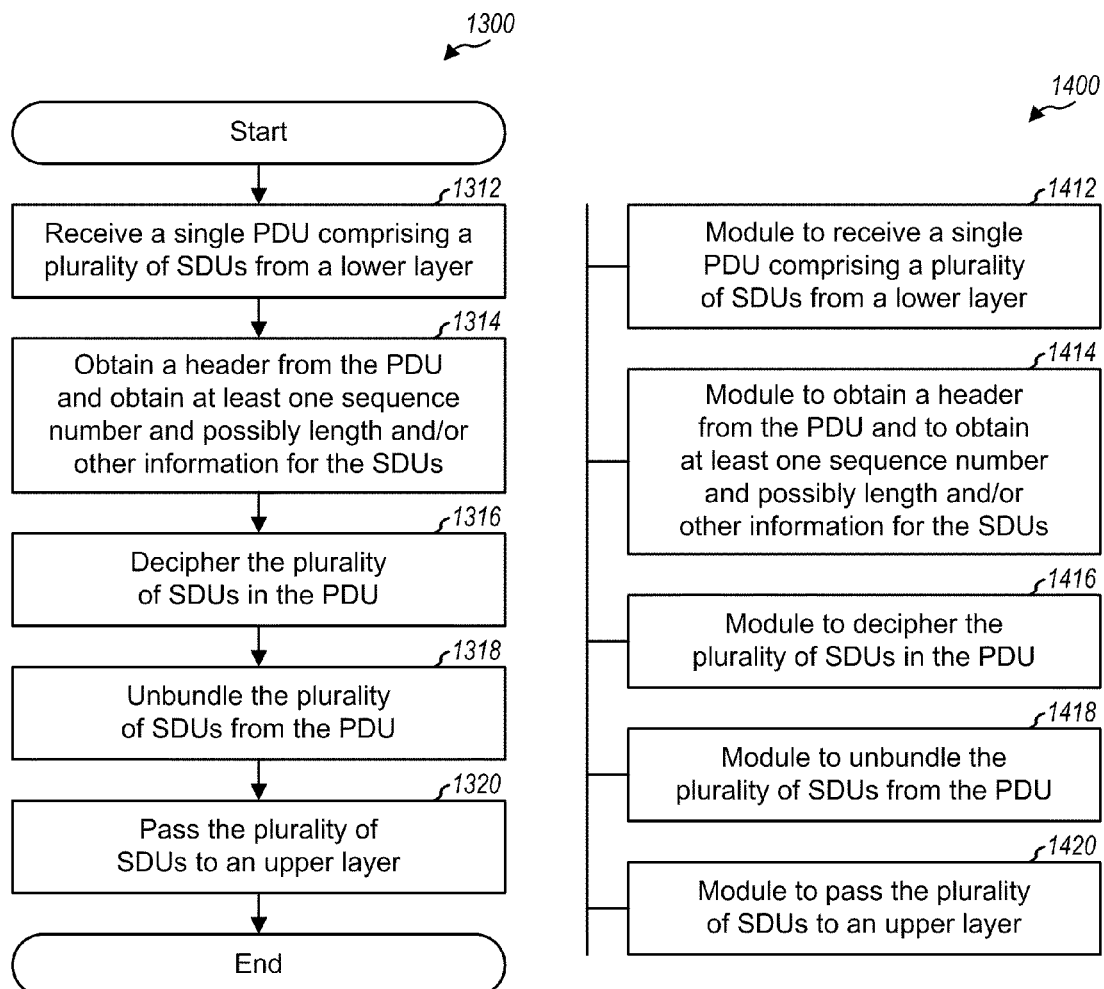
FIG. 13 shows a process for receiving data sent with bundling and ciphering.
FIG. 14 shows an apparatus for receiving data sent with bundling and ciphering.

FIG. 13 shows a design of a process 1300 for receiving data in a communication network. Process 1300 may be performed by a receiving entity, which may be at a base station/eNB, a UE, or some other entity. The receiving entity may receive a single PDU comprising a plurality of SDUs from a lower layer (block 1312). The receiving entity may obtain a header from the PDU and may obtain at least one sequence number and possibly length and/or other information for the SDUs in the PDU (block 1314). The header may have the format shown in FIG. 9B or some other format. The receiving entity may decipher the plurality of SDUs in the PDU, e.g., based on the at least one sequence number (block 1316). The receiving entity may unbundle the plurality of SDUs from the PDU, e.g., based on the length information (block 1318). The receiving entity may pass the plurality of SDUs to an upper layer (block 1320).

In one design of block 1316, the receiving entity may generate a single count value based on a sequence number of a designated SDU (e.g., the first SDU) among the plurality of SDUs and may decipher all SDUs based on the single count value. In another design, the receiving entity may partition the plurality of SDUs into segments, with each segment including at least two SDUs. The receiving entity may generate a count value for each segment based on a sequence number of a designated SDU in the segment and may decipher the at least two SDUs in each segment based on the count value for the segment.

In one design of process 1300 in FIG. 13, the plurality of SDUs may be PDCP SDUs, and the PDU may be a PDCP PDU. The plurality of SDUs and the PDU may also be SDUs and PDU for some other protocol. The processing in FIG. 13 may also be performed in other orders different from the order shown in FIG. 13. For example, unbundling may be performed prior to deciphering, etc.

FIG. 14 shows a design of an apparatus 1400 for receiving data in a communication network. Apparatus 1400 includes a module 1412 to receive a single PDU comprising a plurality of SDUs from a lower layer, a module 1414 to obtain a header from the PDU and to obtain at least one sequence number and possibly length and/or other information for the SDUs, a module 1416 to decipher the plurality of SDUs in the PDU, a module 1418 to unbundle the plurality of SDUs from the PDU, and a module 1420 to pass the plurality of SDUs to an upper layer.

The modules in FIGS. 12 and 14 may comprise processors, electronic devices, hardware devices, electronic components, logical circuits, memories, software codes, firmware codes, etc., or any combination thereof.

Figure 15:
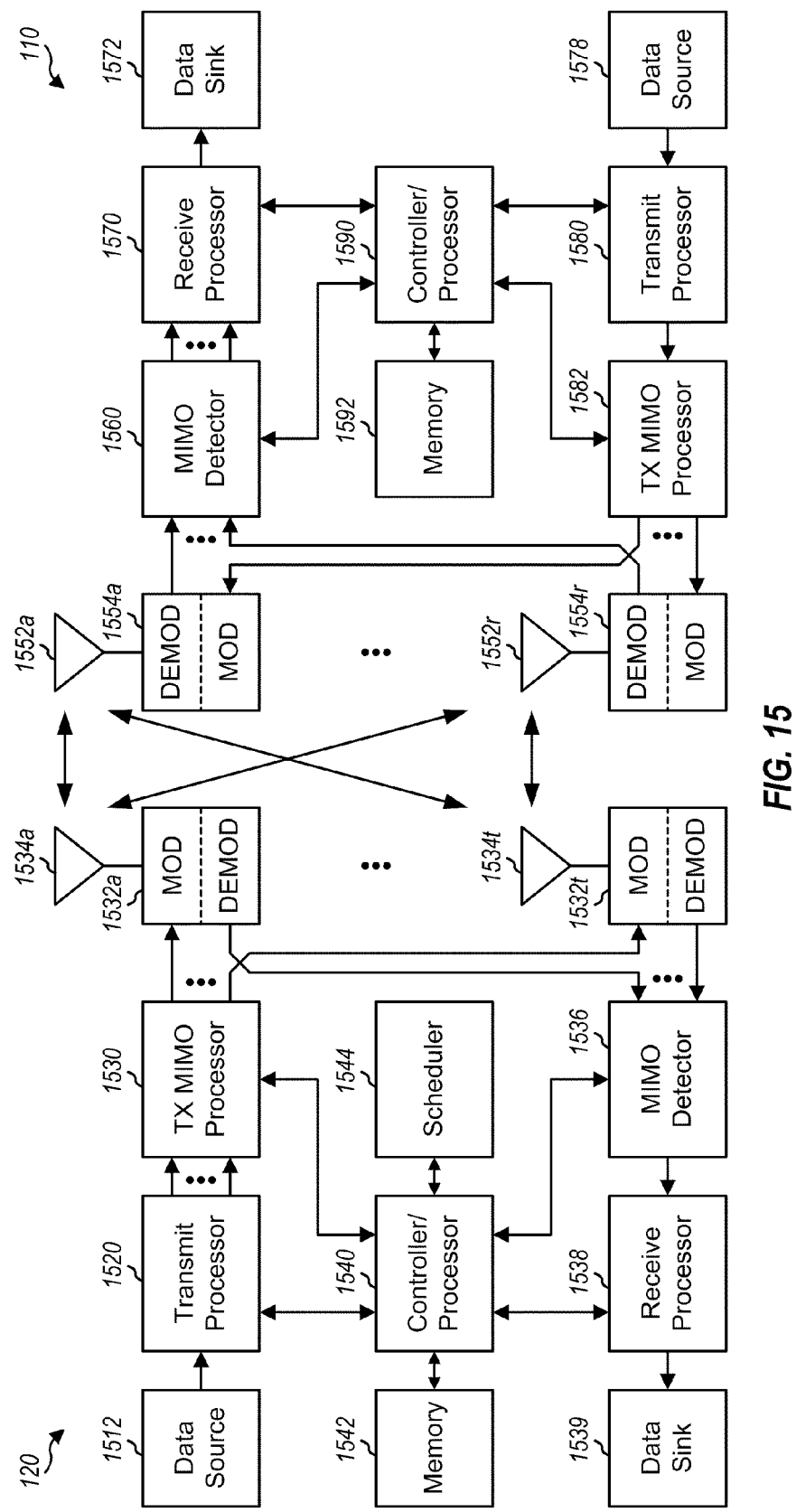
FIG. 15 shows a block diagram of a base station and a UE.

FIG. 15 shows a block diagram of a design of eNB/base station 120 and UE 110. In this design, eNB 120 is equipped with T antennas 1534a through 1534t, and UE 110 is equipped with R antennas 1552a through 1552r, where in general T≥1 and R≥1.

At eNB 120, a transmit processor 1520 may receive data for one or more UEs from a data source 1512 and may process the data for each UE in accordance with a set of protocols (e.g., as shown in FIG. 2) to obtain data symbols. Processor 1520 may also process control information to obtain control symbols. A transmit (TX) multiple-input multiple-output (MIMO) processor 1530 may multiplex the data symbols, the control symbols, and pilot/reference symbols. Processor 1530 may process (e.g., precode) the multiplexed symbols and provide T output symbol streams to T modulators (MOD) 1532a through 1532t. Each modulator 1532 may process a respective output symbol stream (e.g., for OFDM) to obtain an output sample stream. Each modulator 1532 may further process (e.g., convert to analog, amplify, filter, and upconvert) the output sample stream to obtain a downlink signal. T downlink signals from modulators 1532a through 1532t may be transmitted via T antennas 1534a through 1534t, respectively.

At UE 110, antennas 1552a through 1552r may receive the downlink signals from eNB 120 and may provide received signals to demodulators (DEMOD) 1554a through 1554r, respectively. Each demodulator 1554 may condition (e.g., filter, amplify, downconvert, and digitize) a respective received signal to obtain samples and may further process the samples (e.g., for OFDM) to obtain received symbols. A MIMO detector 1560 may obtain and process the received symbols from all R demodulators 1554a through 1554r and provide detected symbols. A receive processor 1570 may process the detected symbols in accordance with the set of protocols, provide decoded data for UE 110 to a data sink 1572, and provide decoded control information to a controller/processor 1590.

On the uplink, at UE 110, data from a data source 1578 and control information may be processed in accordance with the set of protocols by a transmit processor 1580, further processed by a TX MIMO processor 1582 (if applicable), conditioned by modulators 1554a through 1554r, and transmitted via antennas 1552a through 1552r. At eNB 120, the uplink signals from UE 110 may be received by antennas 1534, conditioned by demodulators 1532, detected by a MIMO detector 1536, and processed by a receive processor 1538 to obtain the data and control information sent by UE 110.

Controllers/processors 1540 and 1590 may direct the operation at eNB 120 and UE 110, respectively. Controllers/processors 1540 and 1590 may each implement or direct process 800 in FIG. 8, process 1000 in FIG. 10, process 1100 in FIG. 11, process 1300 in FIG. 13, and/or other processes for the techniques described herein. Memories 1542 and 1592 may store data and program codes for eNB 120 and UE 110, respectively. A scheduler 1544 may schedule UEs for downlink and/or uplink transmission and may provide assignments of resources for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of transmitting data, comprising:
   receiving, at an apparatus, a plurality of service data units (SDUs) from an upper layer, the plurality of SDUs being Packet Data Convergence Protocol (PDCP) SDUs;
   bundling, by a processor of the apparatus, the plurality of SDUs;
   ciphering the plurality of SDUs, the ciphering comprising:
      partitioning the plurality of SDUs into segments, each segment including at least two SDUs,
      generating a count value for each segment based on a sequence number and a hyper-frame number (HFN) of a designated SDU in the segment, the designated SDU being a predetermined SDU in the at least two SDUs of the segment and being identified using the HFN, and
      ciphering the at least two SDUs in each segment based on the count value for the respective segment;
   generating a header comprising at least one sequence number of at least one SDU among the plurality of SDUs, and, for each SDU except for a last SDU among the plurality of SDUs, including an extension field and a length field in the header, wherein the extension field for each SDU indicates whether length information for another SDU will follow in the header, and wherein the length field for each SDU includes length information for the SDU;
   forming a single protocol data unit (PDU) comprising the header and the plurality of bundled SDUs, the PDU being a PDCP PDU; and
   passing, by the processor, the PDU to a lower layer.

2. The method of claim 1, further comprising:
   assigning sequential sequence numbers to the plurality of SDUs.

3. The method of claim 1, wherein the designated SDU is a first SDU among the plurality of SDUs in the PDU.

4. The method of claim 1, wherein the header comprises a single sequence number of a first SDU among the plurality of SDUs.

5. An apparatus for transmitting data, comprising:
means for receiving a plurality of service data units (SDUs) from an upper layer, the plurality of SDUs being Packet Data Convergence Protocol (PDCP) SDUs;
means for bundling the plurality of SDUs;
means for ciphering the plurality of SDUs, the means for ciphering comprising:
means for partitioning the plurality of SDUs into segments, each segment including at least two SDUs,
means for generating a count value for each segment based on a sequence number and a hyper-frame number (HFN) of a designated SDU in the segment, the designated SDU being a predetermined SDU in the at least two SDUs of the segment and being identified using the HFN, and
means for ciphering the at least two SDUs in each segment based on the count value for the respective segment;
means for generating a header comprising at least one sequence number of at least one SDU among the plurality of SDUs, and, for each SDU except for a last SDU among the plurality of SDUs, including an extension field and a length field in the header, wherein the extension field for each SDU indicates whether length information for another SDU will follow in the header, and wherein the length field for each SDU includes length information for the SDU;
means for forming a single protocol data unit (PDU) comprising the header and the plurality of bundled SDUs, the PDU being a PDCP PDU; and
means for passing the PDU to a lower layer.

6. The apparatus of claim 5, further comprising:
means for assigning sequential sequence numbers to the plurality of SDUs.

7. An apparatus for transmitting data, comprising:
at least one processor configured to:
receive a plurality of service data units (SDUs) from an upper layer, the plurality of SDUs being Packet Data Convergence Protocol (PDCP) SDUs;
bundle the plurality of SDUs;
cipher the plurality of SDUs, the at least one processor configured to cipher is further configured to:
partition the plurality of SDUs into segments, each segment including at least two SDUs,
generate a count value for each segment based on a sequence number and a hyper-frame number (HFN) of a designated SDU in the segment, the designated SDU being a predetermined SDU in the at least two SDUs of the segment and being identified using the HFN,
cipher the at least two SDUs in each segment based on the count value for the respective segment;
generate a header comprising at least one sequence number of at least one SDU among the plurality of SDUs, and, for each SDU except for a last SDU among the plurality of SDUs, including an extension field and a length field in the header, wherein the extension field for each SDU indicates whether length information for another SDU will follow in the header, and wherein the length field for each SDU includes length information for the SDU;
form a single protocol data unit (PDU) comprising the header and the plurality of bundled SDUs, the PDU being a PDCP PDU; and
pass the PDU to a lower layer.

8. The apparatus of claim 7, wherein the at least one processor is configured to assign sequential sequence numbers to the plurality of SDUs.

9. A non transitory computer readable medium, comprising:
code for causing at least one computer to receive a plurality of service data units (SDUs) from an upper layer, the plurality of SDUs being Packet Data Convergence Protocol (PDCP) SDUs,
code for causing the at least one computer to bundle the plurality of SDUs,
code for causing the at least one computer to cipher the plurality of SDUs, the code for causing the at least one computer to cipher comprising:
code for causing the at least one computer to partition the plurality of SDUs into segments, each segment including at least two SDUs,
code for causing the at least one computer to generate a count value for each segment based on a sequence number and a hyper-frame number (HFN) of a designated SDU in the segment, the designated SDU being a predetermined SDU in the at least two SDUs of the segment and being identified using the HFN, and
code for causing the at least one computer to cipher the at least two SDUs in each segment based on the count value for the respective segment;
code for causing the at least one computer to generate a header comprising at least one sequence number of at least one SDU among the plurality of SDUs, and, for each SDU except for a last SDU among the plurality of SDUs, including an extension field and a length field in the header, wherein the extension field for each SDU indicates whether length information for another SDU will follow in the header, and wherein the length field for each SDU includes length information for the SDU;
code for causing the at least one computer to form a single protocol data unit (PDU) comprising the header and the plurality of bundled SDUs, the PDU being a PDCP PDU; and
code for causing the at least one computer to pass the PDU to a lower layer.

10. A method of receiving data, comprising:
receiving, at an apparatus, a single protocol data unit (PDU) from a lower layer, the single PDU comprising a header and a plurality of bundled service data units (SDUs), the PDU being a Packet Data Convergence Protocol (PDCP) PDU, the header comprising at least one sequence number of at least one SDU among the plurality of SDUs, and, for each SDU except for a last SDU among the plurality of SDUs, an extension field and a length field, wherein the extension field for each SDU indicating whether length information for another SDU will follow in the header, and wherein the length field for each SDU includes length information for the SDU;
deciphering, by a processor of the apparatus, the plurality of SDUs in the PDU, the deciphering comprising:
partitioning the plurality of SDUs into segments, each segment including at least two SDUs,
generating a count value for each segment based on a sequence number and a hyper-frame number (HFN) of a designated SDU in the segment, the designated SDU being a predetermined SDU in the at least two SDUs of the segment and being identified using the HFN, and
deciphering the at least two SDUs in each segment based on the count value for the respective segment;
unbundling the plurality of SDUs from the PDU; and passing, by the processor, the plurality of SDUs to an upper layer.

11. The method of claim 10, further comprising:
obtaining, from the header, length information for one or more of the plurality of SDUs, wherein the plurality of SDUs are unbundled based on the length information.

12. An apparatus for receiving data, comprising:
means for receiving a single protocol data unit (PDU) from a lower layer, the single PDU comprising a header and a plurality of bundled service data units (SDUs), the PDU being a Packet Data Convergence Protocol (PDCP) PDU, the header comprising at least one sequence number of at least one SDU among the plurality of SDUs, and, for each SDU except for a last SDU among the plurality of SDUs, including an extension field and a length field, wherein the extension field for each SDU indicates whether length information for another SDU will follow in the header, and wherein the length field for each SDU includes length information for the SDU;
means for deciphering the plurality of SDUs in the PDU, the means for deciphering comprising:
means for partitioning the plurality of SDUs into segments, each segment including at least two SDUs,
means for generating a count value for each segment based on a sequence number and a hyper-frame number (HFN) of a designated SDU in the segment, the designated SDU being a predetermined SDU in the at least two SDUs of the segment and being identified using the HFN, and
means for deciphering the at least two SDUs in each segment based on the count value for the respective segment;
means for unbundling the plurality of SDUs from the PDU; and
means for passing the plurality of SDUs to an upper layer.

13. The apparatus of claim 12, further comprising:
means for obtaining, from the header, length information for one or more of the plurality of SDUs, wherein the plurality of SDUs are unbundled based on the length information.

14. An apparatus for receiving data, comprising:
at least one processor configured to:
receive a single protocol data unit (PDU) from a lower layer, the single PDU comprising a header and a plurality of bundled service data units (SDUs), the PDU being a Packet Data Convergence Protocol (PDCP) PDU, the header comprising at least one sequence number of at least one SDU among the plurality of SDUs, and, for each SDU except for a last SDU among the plurality of SDUs, including an extension field and a length field, wherein the extension field for each SDU indicates whether length information for another SDU will follow in the header, and wherein the length field for each SDU includes length information for the SDU;

decipher the plurality of SDUs in the PDU, the at least one processor configured to decipher is further configured to:
partition the plurality of SDUs into segments, each segment including at least two SDUs,
generate a count value for each segment based on a sequence number and a hyper-frame number (HFN) of a designated SDU in the segment, the designated SDU being a predetermined SDU in the at least two SDUs of the segment and being identified using the HFN, and
decipher the at least two SDUs in each segment based on the count value for the respective segment;
unbundle the plurality of SDUs from the PDU; and
pass the plurality of SDUs to an upper layer.

15. A non-transitory computer-readable medium comprising:
code for causing at least one computer to receive a single protocol data unit (PDU) from a lower layer, the single PDU comprising a header and a plurality of bundled service data units (SDUs), the PDU being a Packet Data Convergence Protocol (PDCP) PDU, the header comprising at least one sequence number of at least one SDU among the plurality of SDUs, and, for each SDU except for a last SDU among the plurality of SDUs, including an extension field and a length field, wherein the extension field for each SDU indicates whether length information for another SDU will follow in the header, and wherein the length field for each SDU includes length information for the SDU;
code for causing at least one computer to decipher the plurality of SDUs in the PDU, the code for causing at least one computer to decipher comprising:
code for causing at least one computer to partition the plurality of SDUs into segments, each segment including at least two SDUs,
code for causing at least one computer to generate a count value for each segment based on a sequence number and a hyper-frame number (HFN) of a designated SDU in the segment, the designated SDU being a predetermined SDU in the at least two SDUs of the segment and being identified using the HFN, and
code for causing at least one computer to decipher the at least two SDUs in each segment based on the count value for the respective segment;
code for causing at least one computer to unbundle the plurality of SDUs from the PDU; and
code for causing at least one computer to pass the plurality of SDUs to an upper layer.

16. The method of claim 1, further comprising determining the sequence number of the designated SDU in the segment based on the sequence number of the designated SDU and segment information sent on a header.

* * * * *